Figure 1:
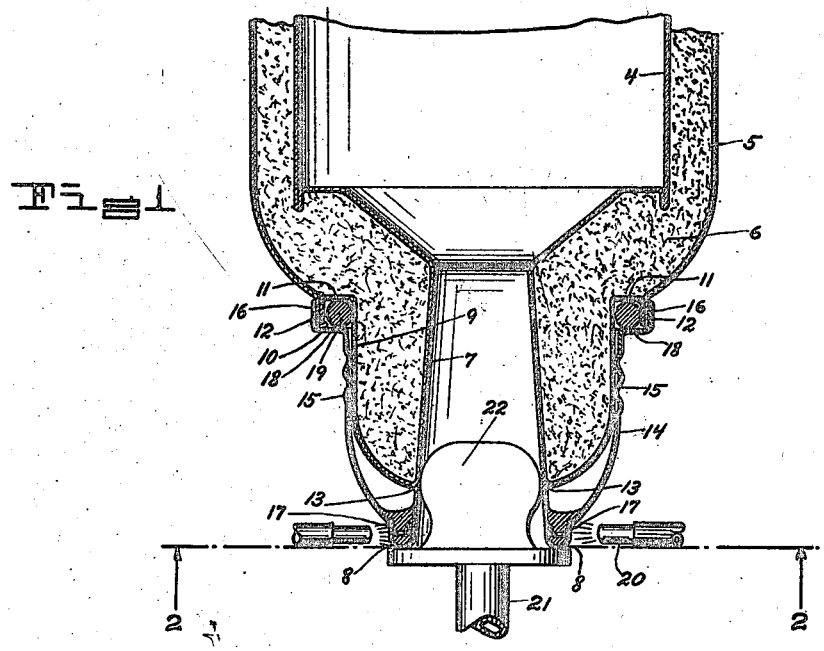

H. M. SMITH.
METALLIC RECEPTACLE AND METHOD OF MAKING THE SAME.
APPLICATION FILED SEPT. 30, 1918.

1,429,698. Patented Sept. 19, 1922.

INVENTOR
Herbert M. Smith
BY
Frank J. Hent
ATTORNEY

Patented Sept. 19, 1922.

1,429,698

UNITED STATES PATENT OFFICE.

HERBERT M. SMITH, OF GREAT BARRINGTON, MASSACHUSETTS, ASSIGNOR TO STANLEY INSULATING COMPANY, OF GREAT BARRINGTON, MASSACHUSETTS, A CORPORATION OF MAINE.

METALLIC RECEPTACLE AND METHOD OF MAKING THE SAME.

Application filed September 30, 1918. Serial No. 256,288.

*To all whom it may concern:*

Be it known that I, HERBERT MILLS SMITH, a citizen of the United States, residing at Great Barrington, in the county of Berkshire and State of Massachusetts, have invented certain new and useful Improvements in Metallic Receptacles and Methods of Making the Same, of which the following is a specification.
This invention relates to improvements in vacuum bottles of the general type shown in the United States Patent to William Stanley No. 1,071,817 in which there are two metallic shells, an inner container and an outer envelope enclosing a vacuous space between them which is preferably filled with a finely divided insulating material which is in part inert and incapable of giving off gases under the conditions of use of the bottle, and which is in part capable of absorbing gases which may exist in the vacuous space.

In the manufacture of such bottles it is usual to provide the inner container with a reduced neck portion and also to reduce the outside envelope correspondingly, the end of the outside envelope being welded to the outer surface of the neck portion of the inner container at a point short of the mouth of the inner container. It is also regular practice in the making of such vacuum bottles to connect the reduced or neck portion of the outside envelope to the main or body portion thereof by means of a weld, each of the welded parts constituting a flange, which flanges are welded together, and the weld extends longitudinally of the bottle extension. Forward of the point where the neck portion of the outer shell is welded to the neck portion of the inner container the neck of the inner container is turned outwardly and backwardly to form a bead about the mouth, and in order to give a finish to the article it is desirable to put into position a nipple-like member which extends from the backwardly turned end of the inner container to and covering the flange joint between the forward body portion of the outer shell and the constricted neck portion thereof. This nipple-like member is threaded in a portion of its extent to receive the cup or closure which is usually put in place to cover the mouth of the bottle. It is of course impossible to weld this nip-
ple-like member in position, and accordingly soldering has to be resorted to. It is one of the objects of this invention to provide for this soldering in a most effective way, and incidentally, to strengthen the backwardly turned end of the inner container so as to eliminate to a large extent the possibility of collapse or deformation in use.

Other objects and aims of the invention, more or less broad than those stated above, will be in part obvious and in part specifically referred to in the course of the following description of the elements, combinations, arrangements of parts and applications of principles constituting the invention; and the scope of protection contemplated will appear from the claims.

Figure 2:
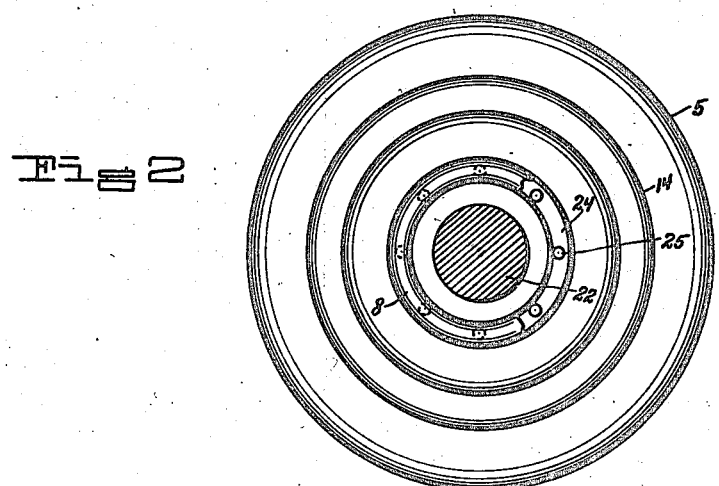
Figure 3:
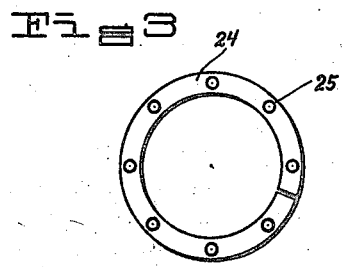

In the accompanying drawings which are to be taken as a part of this specification, and in which I have shown a merely preferred form of embodiment of the invention, Figure 1 is a central vertical sectional view of a bottle of the kind referred to illustrating the application of my invention thereto; Figure 2 is an end view taken on the line 2—2 of Figure 1 looking in the direction of the arrows and with parts broken away; and Figure 3 is a detail of the strengthening ring.

Referring to the numerals on the drawings, 4 indicates the body of the inner container and 5 indicates the body portion of the surrounding outer shell of a bottle of the kind shown in the Stanley patent above mentioned. 6 indicates the finely divided insulating material occupying the vacuous space. The inner container has a reduced neck portion 7 which at its outer end is outwardly and backwardly turned to form a bead 8. The numeral 9 indicates a neck piece for the outer shell. This neck piece has a flange 10 parallel to the longitudinal axis of the bottle and joined to the rest of the neck piece 9 by means of an annulus 11. Thus there is provided a space between the flange 10 and the neck piece, and the flange 10 in practice is welded to a corresponding flange 12 formed on the body of the outer shell. 13 indicates the weld joint between the neck 7 and the forward end of the neck piece 9. 14 indicates a nipple provided intermediate its ends with a threaded portion 15 for engagement with a cup or cover. For obvious reasons this nipple cannot be welded in position and accordingly must be soldered. The nipple is provided with a flange portion 16 which takes over the flange 12 of the outer shell, and which is to be soldered in this position, and the forward end of the nipple is constricted as shown so that it just makes abutting contact with the upset end of the neck or mouth piece of the inner container. If this abutting joint, which I have indicated by the reference character 17, were merely a friction or surface-to-surface joint, and not positively closed, it is obvious that dripping or overflow from the bottle when in use might find its way down into the joint and thence into the space between the nipple and the parts which it surrounds, there eventually to give rise to offensive odors, etc. It is therefore most important that this joint should be positively sealed and to accomplish this is one of the primary objects of the invention. Therefore I proceed as follows:

Before the nipple 15 is placed in position, which is done by slipping it over the open end of the bottle, I place within the annular groove formed by the beaded end of the inner container, a quantity of suitable solder in amount sufficient so that when this solder is melted as hereinafter described, its level will be higher than the outer edge of the bead portion 8. The nipple 15 adjacent its flange 16 is provided with a shoulder 18 which when the nipple is in position comes opposite the annulus 11. On this shoulder or ledge 18 I place pieces of suitable solder, or a ring of solder if desired and the nipple with this solder, which I have indicated by the reference character 19, is now put in position as shown in Figure 1, the flange 16 of the nipple in contact with the flange 10, the solder 19 held between the annulus 11 and shoulder 18, and the forward end of the nipple making joint with the upset end of the inner container at 17. Preferably the parts are of such relative size and resiliency that the nipple fits snugly in position at both ends.

The next step in the operation is to apply a soldering flame to the exterior of the nipple at each end where it makes joint with the other parts of the bottle. I have shown a gas burner at 20 and the same may be at the end of a flexible tube so that the flame may be applied at different heights of the bottle. The bottle as a whole is supported on a sort of ball support 21 which has a part 22 that enters into the mouth of the bottle. On this support the bottle may be turned and tilted as required in the course of the soldering operation. Ordinarily I proceed to apply the soldering flame to melt the solder in the head 8 and close the joint 17 as indicated in Figure 1. The application of heat at this point rarifies the air inside the bottle and a part of this rarified air escapes through the still open joint between the flanges 12 and 16. The soldering flame is now applied at the flange 16 and shoulder 18 to melt the solder 19. As this is going on the bottle is tilted towards the flame so that the molten solder runs down and seals the opening between the nipple flange 16 and the shell flange 12. As the operation goes on the bottle is slowly turned, all the while being kept in the tilted position, and the joint between the shell and the bottle is gradually closed up, but until the sealing is complete it is obvious that the rarified air is free to escape. The result is that the nipple is soldered in position at both ends, all joints are absolutely tight and there is an air space between the nipple and the bottle which it surrounds, partly rarified and to that extent better insulation than a plain dead air space would be.

In many instances, and particularly when dealing with large sized bottles where the bead at the mouth is of considerable width in cross section, it is desirable to strengthen the bead or groove against collapse or deformation. Accordingly I may place within the groove a strengthening ring 24 which may conveniently be a split ring provided at intervals with through openings 25. This ring is shaped so that it fits down between the walls of the groove or bead 8, making contact with both of them so that it will be held spaced above the bottom of the groove. Obviously, the solder in the groove as it melts will flow through the openings 25 and lock the ring 24 firmly in position, thus reinforcing the mouth portion of the bottle. To test the tightness of the soldered joints I may dip the neck end of the receptacle into boiling water, so that both soldered joints are submerged. Thereupon, if there be any leak the air contained in the space between the tubular member or nipple and the bottle neck, expanding under the heat, will show itself by bubbling through the water and thus indicate the location of the leak.

I claim:

1. A device of the kind described having a neck piece terminating in a rearwardly directed flange, and a tubular member surrounding the neck piece and rigidly joined to the latter at the terminus of its rearwardly directed end.

2. A device of the kind described having a neck piece terminating in a rearwardly directed flange, a second neck piece joined to the first mentioned neck piece inwardly of the rearwardly directed flange, and a tubular member or nipple spanning the space between said neck pieces and joined to the latter at its ends.

3. A device of the kind described provided with an inner container and an outer surrounding shell, the inner container having a neck piece with an outwardly and backwardly turned end forming an annular groove, the surrounding outer shell having a neck piece joined to it at one end and joined to the neck piece of the inner container short of the end of the latter, and a tubular member or nipple surrounding the neck pieces of both shells, joined to the outer shell at the point where the neck piece of the latter begins, and joined to the neck piece of the inner container along the edge of the outwardly turned end thereof.

4. A device of the kind described provided with an inner container and an outer surrounding shell, the inner container having a neck piece with an outwardly and backwardly turned end forming an annular groove, the surrounding outer shell having a neck piece joined to it at one end and joined to the neck piece of the inner container short of the end of the latter and a tubular member or nipple surrounding the neck pieces of both shells, joined to the outer shell at the point where the neck piece of the latter begins, and joined to the neck piece of the inner container along the edge of the outwardly turned end thereof, the tubular member or nipple being internally soldered to both neck pieces.

5. A device of the kind described provided with an inner container and an outer surrounding shell, the inner container having a neck piece with an outwardly and backwardly turned end forming an annular groove, the surrounding outer shell having a neck piece joined to it at one end and joined to the neck piece of the inner container short of the end of the latter, and a tubular member or nipple surrounding the neck pieces of both shells, joined to the outer shell at the point where the neck piece of the latter begins, and joined to the neck piece of the inner container along the edge of the outwardly turned end thereof, and a perforated strengthening ring within the grooved upset end of the neck of the inner container.

6. The method of securing in concentrically spaced relation a finishing piece in the form of a tubular member or nipple about the neck portion of an article of the kind described, which consists in melting solder within the space and between the tubular member and the neck portion adjacent the ends of the tubular member.

7. The method of securing in concentrically spaced relation a finishing piece in the form of a tubular member or nipple about the neck portion of an article of the kind described, which consists in melting solder within the space and between the tubular member and the neck portion adjacent the ends of the tubular member, first at the outer end of the tubular member and then at the inner end thereof.

8. A device of the kind described provided with an inner container and an outer surrounding shell, the inner container having a neck piece with an outwardly and backwardly turned end forming an annular groove, the surrounding outer shell having a neck piece joined to the neck piece of the inner container short of the end of the latter, and a tubular member or nipple joined to the neck pieces of said container and shell.

9. A device of the kind described provided with an inner container and an outer surrounding shell, the inner container having a neck piece with an outwardly and backwardly turned end forming an annular groove, the surrounding outer shell having a neck piece joined to the neck piece of the inner container short of the end of the latter, a tubular member or nipple joined to the neck pieces of said container and shell and a reinforcing member arranged within the annular groove of the inner container.

In testimony whereof I affix my signature.

HERBERT M. SMITH.